(12) United States Patent
Spitler et al.

(10) Patent No.: US 9,695,084 B2
(45) Date of Patent: Jul. 4, 2017

(54) PREPARATION FOR FIBERGLASS AIR FILTRATION MEDIA

(71) Applicants: Charles Douglas Spitler, Southlake, TX (US); Rodney Ray Wilkins, Granville, OH (US)

(72) Inventors: Charles Douglas Spitler, Southlake, TX (US); Rodney Ray Wilkins, Granville, OH (US)

( * ) Notice: Subject to any disclaimer, the term of this patent is extended or adjusted under 35 U.S.C. 154(b) by 0 days.

(21) Appl. No.: 15/151,478

(22) Filed: May 10, 2016

(65) Prior Publication Data
US 2016/0332907 A1   Nov. 17, 2016

Related U.S. Application Data

(60) Provisional application No. 62/179,572, filed on May 11, 2015.

(51) Int. Cl.
*B01D 39/20* (2006.01)
*B29C 53/66* (2006.01)
(Continued)

(52) U.S. Cl.
CPC ........ *C03C 17/3405* (2013.01); *B01D 39/163* (2013.01); *B01D 39/2024* (2013.01); *B01D 46/0035* (2013.01); *B29C 53/66* (2013.01); *B29C 67/248* (2013.01); *C03C 17/32* (2013.01); *C03C 25/285* (2013.01); *C03C 25/30* (2013.01); *C03C 25/34* (2013.01); *C09J 133/02* (2013.01);
(Continued)

(58) Field of Classification Search
CPC ............ B01D 39/2024; B01D 46/0035; C03C 25/285; C03C 25/30; C03C 25/34; C08J 3/05; C08J 2323/20; C08J 2323/22; C08J 2333/02; C08J 2361/24; C08L 2666/04; C08L 2666/06; C08L 2666/16; C08L 23/20; C08L 23/22; C08L 33/02; C08L 61/24; C09J 133/02; C09J 161/24; B29C 53/66; B29C 53/665; B29C 67/248; D04H 3/004; D04H 3/12
See application file for complete search history.

(56) References Cited

U.S. PATENT DOCUMENTS 2,081,060 A   5/1937 Modigliani
2,357,676 A * 9/1944 Mack ................ C08L 7/02
524/274

(Continued)

FOREIGN PATENT DOCUMENTS

WO    2011106537 A1   9/2011

OTHER PUBLICATIONS

ANSI/ASHRAE Addendum b to ANSI/ASHRAE Standard 52.2-2007 (ASHRAE Standard 52.2 Appendix J).

*Primary Examiner* — Michael Tolin
(74) *Attorney, Agent, or Firm* — Bakos & Kritzer

(57) ABSTRACT

A system and method of forming fiberglass air filtration media is disclosed which does not require the use of oil additives. A mixture of resin binder, polymer, and dry adhering agent is formed and applied to the fiberglass as it spins onto the drum. Additionally, the fiberglass filtration media density can vary such that the fiber on the air inflow is less dense than the fiber on the air outflow. After oven curing, the finished air filtration media has an improved ability to attract and hold dust and other contaminants.

10 Claims, 4 Drawing Sheets

| MERV | Min. particle size | Typical controlled contaminant | Typical Application |
|---|---|---|---|
| 1–4 | > 10.0 μm | Pollen, dust mites, cockroach debris, sanding dust, spray paint dust, textile fibers, carpet fibers | Residential window AC units |
| 5–8 | 10.0–3.0 μm | Mold, spores, dust mite debris, cat and dog dander, hair spray, fabric protector, dusting aids, pudding mix | Better residential, general commercial, industrial workspaces |
| 9–12 | 3.0–1.0 μm | Legionella, Humidifier dust, Lead dust, Milled flour, Auto emission particulates, Nebulizer droplets | Superior residential, better commercial, hospital laboratories |
| 13–16 | 1.0–0.3 μm | Bacteria, droplet nuclei (sneeze), cooking oil, most smoke and insecticide dust, most face powder, most paint pigments | Hospital & general surgery |
| 17–20 | < 0.3 μm | Virus, carbon dust, sea salt, smoke | Electronics & pharmaceutical manufacturing cleanroom |

(51) Int. Cl.

| | | |
|---|---|---|
| *C09J 133/02* | (2006.01) | |
| *C09J 161/24* | (2006.01) | |
| *D04H 3/004* | (2012.01) | |
| *D04H 3/12* | (2006.01) | |
| *C03C 17/34* | (2006.01) | |
| *B01D 39/16* | (2006.01) | |
| *C03C 17/32* | (2006.01) | |
| *B29C 67/24* | (2006.01) | |
| *C03C 25/28* | (2006.01) | |
| *B01D 46/00* | (2006.01) | |
| *C03C 25/30* | (2006.01) | |
| *C03C 25/34* | (2006.01) | |

(52) U.S. Cl.
CPC ............ *C09J 161/24* (2013.01); *D04H 3/004* (2013.01); *D04H 3/12* (2013.01); *B01D 2239/0478* (2013.01); *B01D 2239/0492* (2013.01); *B01D 2239/0627* (2013.01); *B01D 2239/10* (2013.01); *B01D 2239/1208* (2013.01); *B01D 2239/1233* (2013.01); *B01D 2239/1258* (2013.01)

(56) References Cited

U.S. PATENT DOCUMENTS

| | | |
|---|---|---|
| 2,644,780 A | 1/1949 | Simkins et al. |
| 2,460,899 A | 2/1949 | Modigliani et al. |
| 2,505,045 A * | 4/1950 | Holcomb ............... C04B 26/02 156/166 |
| 2,546,230 A | 3/1951 | Modigliani |
| 2,574,221 A | 11/1951 | Modigliani |
| 2,609,320 A | 9/1952 | Modigliani |
| 2,779,969 A | 1/1953 | Bose |
| 2,729,582 A | 1/1956 | Modigliani |
| 2,751,483 A | 6/1956 | Keen et al. |
| 2,913,037 A | 11/1959 | Modigliani |
| 2,964,439 A | 12/1960 | Modigliani |
| 2,997,096 A | 8/1961 | Morrison et al. |
| 3,082,615 A | 3/1963 | Alvarez de Toledo |
| 3,096,161 A | 7/1963 | Morrison et al. |
| 3,097,710 A | 7/1963 | Copenhefer |
| 3,134,704 A | 5/1964 | Modigliani |
| 3,526,488 A | 4/1967 | Schweppe et al. |
| 3,322,585 A | 5/1967 | Weber et al. |
| 3,459,613 A | 8/1969 | Copenhefer et al. |
| 3,476,635 A | 11/1969 | Heh |
| 3,526,557 A | 9/1970 | Taylor, Jr. |
| 3,573,016 A | 3/1971 | Rees |
| 3,826,903 A | 7/1974 | Varasso |
| 3,837,138 A | 9/1974 | Terry |
| 3,937,860 A | 2/1976 | Gusman et al. |
| 4,121,918 A | 10/1978 | Shono et al. |
| 4,227,906 A | 10/1980 | Reiser |
| 4,263,007 A | 4/1981 | Battigelli et al. |
| 4,321,074 A | 3/1982 | Glaser et al. |
| 4,334,468 A | 6/1982 | Guttinger et al. |
| 4,363,645 A | 12/1982 | Eisenberg |
| 4,380,462 A | 4/1983 | Shono et al. |
| 4,566,154 A | 1/1986 | Streeper et al. |
| 4,601,937 A | 7/1986 | Latussek |
| 4,773,764 A | 9/1988 | Colombani et al. |
| 4,940,502 A | 7/1990 | Marcus |
| 5,139,841 A | 8/1992 | Makoui et al. |
| 5,149,394 A | 9/1992 | Held |
| 5,284,546 A | 2/1994 | Tilby |
| 5,330,595 A | 7/1994 | Held |
| 5,340,651 A | 8/1994 | Esu |
| 5,458,051 A | 10/1995 | Alden et al. |
| 5,532,050 A | 7/1996 | Brooks |
| 5,578,371 A | 11/1996 | Taylor et al. |
| 5,612,405 A * | 3/1997 | Bainbridge ............... C08K 9/08 524/494 |
| 5,618,622 A | 4/1997 | Gillberg-Laforce et al. |
| 5,672,399 A | 9/1997 | Kahlbaugh et al. |
| 5,695,848 A | 12/1997 | Wilkins et al. |
| 5,832,696 A | 11/1998 | Nagy et al. |
| 5,846,603 A * | 12/1998 | Miller ................ B01D 39/2013 427/244 |
| 6,054,081 A | 4/2000 | Bielfeldt |
| 6,136,058 A | 10/2000 | Miller |
| 6,200,682 B1 | 3/2001 | Dubelsten et al. |
| 6,605,245 B1 | 8/2003 | Dubelsten et al. |
| 6,821,614 B1 | 11/2004 | Dubelsten et al. |
| 6,863,512 B2 | 3/2005 | Dubelsten et al. |
| 8,057,566 B1 | 11/2011 | Sanders et al. |
| 8,080,488 B2 | 12/2011 | Anderson et al. |
| 8,393,180 B1 | 3/2013 | Sanders et al. |
| 9,101,860 B2 | 8/2015 | Green et al. |
| 2004/0163540 A1 | 8/2004 | Mori et al. |
| 2005/0006808 A1 | 1/2005 | Thomas |
| 2005/0067113 A1 | 3/2005 | Colson et al. |
| 2005/0138832 A1 | 6/2005 | Hada et al. |
| 2006/0093815 A1 | 5/2006 | Wilkins |
| 2007/0049143 A1 | 3/2007 | D'Silva et al. |
| 2008/0015301 A1* | 1/2008 | Grooms ................ C08L 61/24 524/500 |
| 2008/0105612 A1 | 5/2008 | Chappas |
| 2011/0086567 A1 | 4/2011 | Hawkins et al. |
| 2011/0114554 A1 | 5/2011 | Li et al. |
| 2012/0255662 A1 | 10/2012 | Green |
| 2012/0271445 A1 | 10/2012 | Li et al. |
| 2012/0298582 A1 | 11/2012 | Kanani et al. |
| 2012/0304603 A1 | 12/2012 | Wyss et al. |
| 2014/0196423 A1* | 7/2014 | Barrows ................ B01D 46/10 55/501 |

\* cited by examiner

| MERV | Min. particle size | Typical controlled contaminant | Typical Application |
|---|---|---|---|
| 1–4 | > 10.0 μm | Pollen, dust mites, cockroach debris, sanding dust, spray paint dust, textile fibers, carpet fibers | Residential window AC units |
| 5–8 | 10.0–3.0 μm | Mold, spores, dust mite debris, cat and dog dander, hair spray, fabric protector, dusting aids, pudding mix | Better residential, general commercial, industrial workspaces |
| 9–12 | 3.0–1.0 μm | Legionella, Humidifier dust, Lead dust, Milled flour, Auto emission particulates, Nebulizer droplets | Superior residential, better commercial, hospital laboratories |
| 13–16 | 1.0–0.3 μm | Bacteria, droplet nuclei (sneeze), cooking oil, most smoke and insecticide dust, most face powder, most paint pigments | Hospital & general surgery |
| 17–20 | < 0.3 μm | Virus, carbon dust, sea salt, smoke | Electronics & pharmaceutical manufacturing cleanroom |

Fig. 1

| Element | Line Type | Wt% | Wt% Sigma | Atomic % |
|---|---|---|---|---|
| C | K series | 70.07 | 0.22 | 75.84 |
| O | K series | 29.50 | 0.21 | 23.97 |
| Na | K series | 0.13 | 0.03 | 0.07 |
| S | K series | 0.30 | 0.03 | 0.12 |
| Total: | | 100.00 | | 100.00 |

PREPARATION FOR FIBERGLASS AIR FILTRATION MEDIA

CROSS-REFERENCE TO RELATED APPLICATION

This application claims the benefit of U.S. Patent Application No. 62/179,572, filed on May 11, 2015.

TECHNICAL FIELD

The present disclosure relates to air filtration media and, more particularly, to air filtration media manufactured to a Minimum Efficiency Reporting Value (MERV) 8 rating and above with an initial pressure drop of less than or equal to 0.20 inches water gravity (WG). The MERV 8 rating and greater can be achieved with fiberglass media without the addition of an undesirable oil coating.

BACKGROUND

Today, fiberglass air filtration manufacturing methods and formulations can involve the use of oil added after the fiberglass media exits the curing oven to provide for increased entrainment of air contaminants such as dust and particulates. Present solutions handle the problem of capturing increased amounts of dust using the oil method.

The oil additive is undesirable since the oil makes the process more expensive in additive costs, handling costs, and environmental costs and is cosmetically undesirable. Binders are applied to the fibers as they are wound on the drum. Binder mixtures often are comprised of 65% urea formaldehyde and 35% water. In other methods, 1 butyl tackifiers may be mixed into a water emulsion and then mixed with a urea formaldehyde emulsion binder. Urea formaldehyde emulsion is typically used as a binder of glass fibers in the fiberglass filtration industry.

Other patents have mentioned the use of a dry tackifier binder such as polybutene added to a composition to create a tackifier for spraying fiberglass filtration media. For example, see Miller U.S. Pat. No. 6,136,058, entitled "Uniformly Tacky Filter Media," and Miller U.S. Pat. No. 5,846,603, entitled "Uniformly Tacky Filter Media." However, the addition of polybutene, while useful, does not reach the MERV 8 rating and higher. In fact, the addition of polybutene barely achieves a MERV 7 rating by itself and then not routinely. Modigliani U.S. Pat. No. 2,546,230, entitled "Glass Product and Method of Making the Same," and Modigliani U.S. Pat. No. 2,729,582, entitled "Method for Making Unwoven Fabrics," both mention the use of additives to the fiberglass media. However, in Modigliani U.S. Pat. No. 2,546,230, the binder cited is being utilized for fiber board insulation and is water mixed with urea formaldehyde resin with the addition of an acrylic resin. In Modigliani U.S. Pat. No. 2,729,582, the resin is a vinyltrichlorosilane in a 3.5% solution of xylol, which is not suitable for fiberglass filtration media, but rather more suitable for composites. This disclosure presents a composition that achieves and sustains a MERV 8 rating and higher.

MERV, Minimum Efficiency Reporting Value, commonly known as MERV rating, is a measurement scale designed in 1987 by the American Society of Heating, Refrigerating and Air-Conditioning Engineers (ASHRAE) to rate the effectiveness of filters. The scale "represents a quantum leap in the precision and accuracy of air-cleaner" and allows for improved health, reduced cost and energy efficiency in heating, ventilation and air conditioning (HVAC) design as well as increased efficiency. For example, a HEPA filter is often impractical in central HVAC systems due to the large initial pressure drop the dense filter material causes. Experiments indicate that less obstructive, medium-efficiency filters of MERV 7 to 13 are almost as effective as true HEPA filters at removing allergens, with much lower associated system and operating costs. In like fashion, the addition of a polymer compounded with a dry adherent and a resin binder provides for a filter media without a high initial pressure drop.

The scale is designed to represent the worst-case performance of a filter when dealing with particles in the range of 0.3 to 10 micrometers. The MERV rating is from 1 to 16. Higher MERV ratings correspond to a greater percentage of particles captured on each pass, with a MERV 16 filter capturing more than 95% of particles over the full range.

Shown in FIG. 1 is a table grouping MERV ratings by particle size:

Prior techniques exist however for the addition of resins such as acrylate polymers to polyester pleat filtration media and binder (with no urea formaldehyde). However, acrylate polymers have never been combined with urea formaldehyde and polybutene and then applied to fiberglass filtration media.

It would be advantageous to provide a system and method of air filtration formation and media that increase dust holding capacity.

It would also be advantageous to provide a method of formation of MERV 8 or higher air filtration media with fiberglass that does not require the use of oil.

It would further be advantageous to provide a method of controlling the cross-sectional density of the fiber to maximize the dust holding capacity of the filter media while controlling the initial pressure drop.

It would also be advantageous to provide for a finished filter media that feels and looks different from fiberglass.

It would also be advantageous to provide for a fiber that is relatively soft, springy and dry to the touch, with fibers that look more like plastic than fiberglass.

Thus there remains considerable need for binder compositions that provide for less mess and are cosmetically more pleasing to customers while providing for increased dust holding capability at a MERV 8 or better. Additionally, the fiber should be capable of progressive density with a soft springy texture.

SUMMARY

In accordance with the present disclosure, there is provided a system and method of forming air filtration media that does not involve the use of an oil additive to fiberglass, yet creates a MERV filter rating of 8 or better. The manufacturing method of forming the air filtration media is mentioned in a co-pending U.S. patent application Ser. No. 14/181,426, filed on Feb. 14, 2014, which is incorporated by reference herein.

To achieve MERV 8 or better without undesirable oil additives, a polymer, wherein the polymer is one of a group of polymers consisting of acrylates and methyl acrylic acids, is added to a dry adhering agent consisting essentially of a group of polybutene during the fiberglass air filtration media formation. Both the polymer and the dry adhering agent mix in varying percentages with a resin binder (urea formaldehyde) and are applied to the fiberglass as it is spun onto a drum. In varying the application rates of the combined binder resin mixed with a polymer selected from a group of polymers formed from acrylic acid or methyl-acrylic acid and a dry adhering agent, e.g. polybutene in a specific formulation, so that the end result can be controlled with greater precision.

Various objects, features, aspects, and advantages of the present disclosure will become more apparent from the following description of the disclosure, along with the accompanying drawings.

BRIEF DESCRIPTION OF THE DRAWINGS

The detailed description makes reference to the accompanying figures wherein:

FIG. 1 shows a table grouping MERV ratings by particle size.

Other objects, features, and characteristics will become more apparent upon consideration of the following detailed description with reference to the accompanying figures.

DETAILED DESCRIPTION

Figure 2:
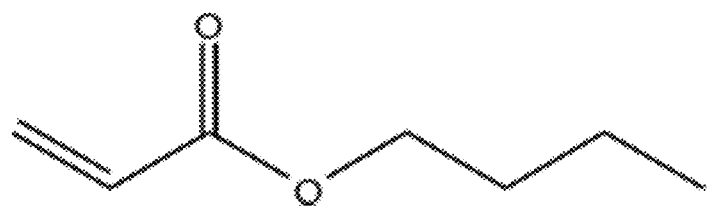
FIG. 2 depicts a chemical structure indicative of a selected group of acrylate polymers, consisting of a 1-butyl, a methyl, an n-butyl acrylate and others in a polymeric structure.
Figure 3:
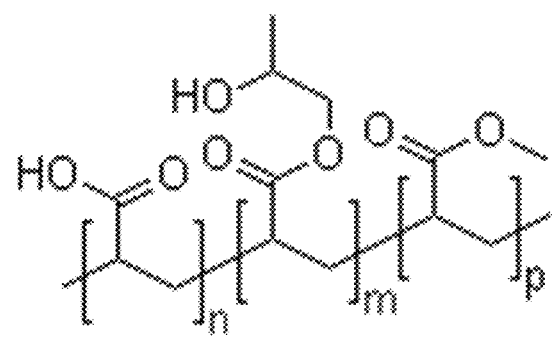
FIG. 3 depicts a chemical structure representative of the structures of acrylic and methyl-acrylic acid which are the basis of the methyl-acrylic polymers discussed herein.

The chemical structure shown in FIG. 2 is the general structure that is indicative of a selected group of acrylate polymers, consisting of a 1-butyl, a methyl, an n-butyl acrylate and others in a polymeric structure. For purposes of comparison, the IUPAC lists this selection of acrylates as -prop-2-enoate (either butyl or methyl). The chemical reaction of a selected polymer with a dry adherent and a resin binder (which also acts as an additional adherent) creates a polymeric-based tackifying agent with substantial dust holding capabilities. Ingredients in the acrylates copolymer group all contain the monomers acrylic acid and methyl-acrylic acid or one of their salts or esters. The drawing shown in FIG. 3 is more closely representative of the structures of acrylic and methyl-acrylic acid which are the basis of the methyl-acrylic polymers discussed.

These ingredients are considered similar in that they are uniformly produced in chemical reactions that leave very little residual monomer. Although residual acrylic acid may be as high as 1500 ppm, typical levels are 10 to 1000 ppm. Concentrations may be as high as 25% if used as a binder, film former, or fixative; or as low as 0.5% if used as a viscosity-increasing agent, suspending agent, or emulsion stabilizer.

Figures 4A, 4B:
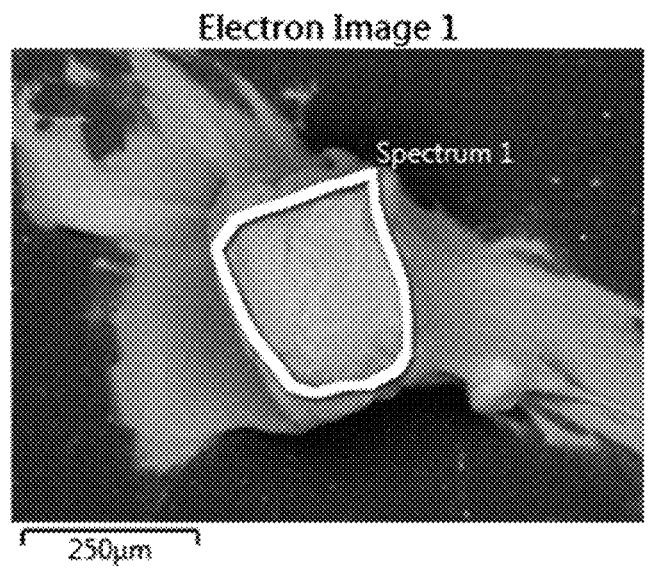
FIG. 4A shows an electron micrograph of a polymer discussed herein.
FIG. 4B shows information presented by an analysis of the polymer by electron micrograph.
Figure 5:
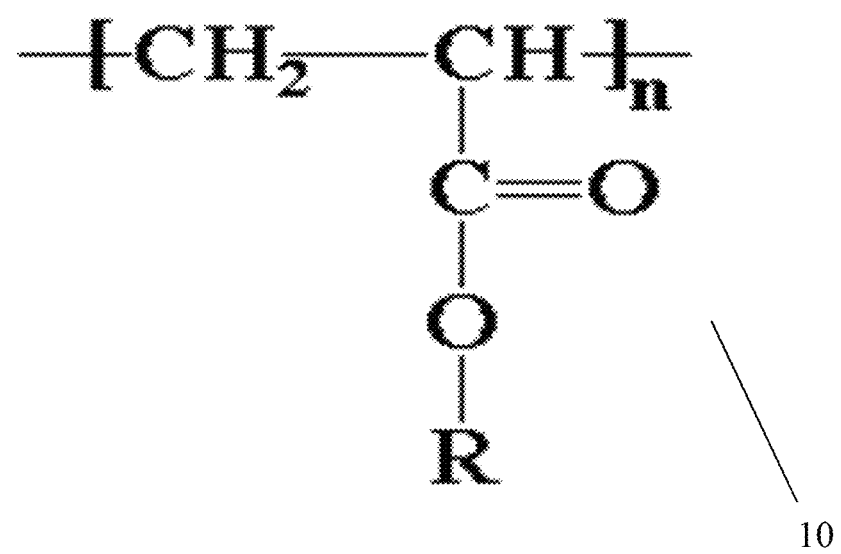
FIG. 5 is a chemical formula for the most common form of an acrylate polymer 10 utilized in one embodiment of this disclosure.

Analysis of polymer 10 (shown in FIG. 5) by electron micrograph presents the information shown in FIGS. 4A and 4B.

The structure presented provides a desirable basis for binding and adhesive properties with the carbon and oxygen bonds being of the most significance with the sulfur presenting minimally in the base formulation. The sodium presents as a salt of the acrylic or meth-acrylic acid.

The dry adhering agent is a polymer of the group consisting essentially of 1-butene and 2-butene and isobutene. The structure of the 1-butene and the 2-butene is seen in the repeat units, where, in the case of 1-butene, the structure is:

and in the case of 2-butene, the repeat unit structure is:

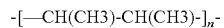

The C4 polymer typically includes various forms of butene, for example isobutene, 1-butene, 2-butene, and others, and can contain a small amount of propene and minor amounts of polymerization byproducts. For simplicity, the polymer is referred to herein as polybutene polymer. Typically, isobutene constitutes from about 80% to about 95% of the total polybutene polymer. The polybutene polymer has at least one double bond per molecule.

The thickness of the skinning of the fiberglass on the air outflow surface and the air inflow surface are controlled such that the skinning process on the air outflow can be densified while still maintaining an initial pressure drop of less than 0.20 WG for the finished fiberglass air filtration media. Furthermore, the skinning on the air inflow surface can be maintained as thin as varying needs require preventing stray fibers from projecting randomly from the surface. The fiber media between the two skins progressively increases in density such that the fiber on the air inflow is less dense than the fiber on the air outflow of the fiberglass filtration media. Progressive density is achieved by varying the speed of the traverses of the furnace over the drum. This density control is achieved in a substantially linear fashion.

After oven curing of the fiber, the finished media feels and looks different from normal fiberglass. It is relatively soft, springy and dry to the touch. The fibers look more like plastic than fiberglass, due in part to the polymeric spray mixture bound to the fiberglass media. The progressive density of the skin of the fiberglass filtration media along with the polymer, resin binder and the dry adhering agent mixture provide for increased dust holding capability by allowing for proper airflow and help to hold the initial pressure drop to 0.20 WG.

The addition of a polymer 10 combined with a dry adhering agent and resin binder increases the ability of the fibers to attract and hold dust such that a MERV 8 rating and above can be achieved with a sustainably low initial pressure drop of 0.20 WG. This is achieved with a fiberglass based media without the addition of an undesirable oil coating. The low initial pressure drop is due in part to the substantially linear progressive density of the fiberglass media coupled with the high dust holding capability. This prevents face loading of the skin surface by large particles.

As indicated in the enclosed drawing and discussion, the polymer 10 is an isotactic polymeric acrylate, which is sticky and typically used in formulations to aid in viscosity and ability to emulsify. In accordance with the present disclosure, there is provided a system and method of forming air fiberglass filtration media that does not involve the addition of oil during the fiberglass manufacture process. A spray composition is formed by combining an acrylate polymer 10 (consisting essentially of the group of polymers such as -prop-2-enoate), a dry adhering agent (a polybutene consisting essentially of a group of 1-butene, 2-butene, and isobutene), and a resin binder. The spray composition is applied during the fiberglass air filtration media formation, as the fiberglass is wound onto the rotating drum. The addition of a polymer 10 and varying percentages of the dry adhering agent with the resin binder mixture increases the dust holding capacity of the resulting fiberglass filtration media.

The progressive density of the fiberglass media progresses from a lower density of fiberglass media at the air inflow surface to higher density of the fiberglass media at the air outflow surface. In the preferred embodiment, the fibers are 21-25 microns with a median size of 23 microns. However, the principles disclosed herein may be used with fibers of other sizes. The progressive density of the fiberglass media, along with the application of the spray composition, acts to impede large particulate movement within the fiberglass media bulk. This increased impedance occurs between the two faces of the skin surfaces from the air inflow skin surface to the air outflow skin surface. These large particulates move less freely through the progressively denser fiberglass bulk and are trapped by the lower density in the region of the air inflow surface of the fiberglass media. This allows finer particles to be trapped in the higher density region of the air outflow surface and outflow side skin.

The spray composition (acrylates, polybutene, and urea formaldehyde) is applied without clogging and is applied to the fiberglass as it is spun onto a drum. The spray composition may comprise 55-79% urea formaldehyde, 20-40% polymer compound, and 1-5% polybutene. In the preferred embodiment, the spray composition comprises 67% urea formaldehyde resin, 30% polymer compound, and 3% polybutene. The spray composition along with the progressive density of the fiberglass media provides an excellent means to capture and hold large dust particulates while avoiding the face-loading of the media common in other types of filtration media. By varying application rates of the spray composition, a specific formulation can be achieved that provides for greater precision.

The density of the skin surfaces on the air outflow and air inflow can be controlled while still maintaining an initial pressure drop of less than 0.20 WG for the finished filter. The skinning on the air inflow surface can be maintained as thin as various needs require, preventing stray fibers from projecting randomly from the surface and facilitating glue adhesion in the customers' filter framing processes. The fiber is then oven cured. After oven curing, the finished media feels and looks different from fiberglass. It is relatively soft, springy and dry to the touch. The fibers look more like plastic than fiberglass.

As disclosed herein, a fiberglass filtration media with the ability to attract and hold dust and achieve a MERV 8 rating and above, without the addition of an undesirable oil coating, is made possible by producing a fiberglass filtration media with progressively increasing density from air inflow to air outflow comprising thin filaments (for example, 21 to 25 microns) and adding polymer combined with a dry adhering agent and a resin binder (urea formaldehyde).

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of the disclosure herein.

What is claimed is:

1. A method for forming air filtration media, comprising:
   providing an isotactic polymeric acrylate;
   adding a dry adhering agent to the isotactic polymeric acrylate;
   combining a resin binder with the isotactic polymeric acrylate and the dry adhering agent to form a composition; and
   spraying the composition onto continuous fiberglass filaments collected on a rotating drum.

2. The method of claim 1, wherein
   the dry adhering agent comprises polybutene; and
   the resin binder comprises urea formaldehyde.

3. The method in accordance with claim 1, wherein the mixture comprises:
   from 20 to 40 percent isotactic polymeric acrylate;
   from 1 to 5 percent dry adhering agent; and
   from 55 to 79 percent resin binder.

4. The method in accordance with claim 1, wherein the mixture comprises:
   30 percent isotactic polymeric acrylate;
   3 percent dry adhering agent; and
   67 percent resin binder.

5. A method for producing fiberglass filtration media, comprising:
   providing continuous fiberglass filaments;
   preparing a mixture comprising:
      an isotactic polymeric acrylate;
      a polybutene; and
      a urea formaldehyde; and
   applying the mixture to the continuous fiberglass filaments as the continuous fiberglass filaments are collected on a spinning drum.

6. The method in accordance with claim 5, comprising:
   forming the continuous fiberglass filaments into a fiberglass media wherein volumetric weight is lower on an air inflow surface of the fiberglass media and volumetric weight is higher on an air exit surface of the fiberglass media.

7. The method in accordance with claim 5, wherein the continuous fiberglass filaments comprise filaments with a diameter of 21 to 25 microns.

8. The method in accordance with claim 5, wherein the mixture comprises:
   from 20 to 40 percent isotactic polymeric acrylate;
   from 1 to 5 percent polybutene; and
   from 55 to 79 percent urea formaldehyde.

9. The method in accordance with claim 5, wherein the mixture comprises:
   30 percent isotactic polymeric acrylate;
   3 percent polybutene; and
   67 percent urea formaldehyde.

10. A method for producing fiberglass media, comprising:
   providing continuous fiberglass filaments with a thickness of 21 to 25 microns;
   collecting the continuous fiberglass filaments on a rotating drum;
   applying a mixture of an isotactic polymeric acrylate, a polybutene, and a urea formaldehyde to the continuous fiberglass filaments as they are collected on the rotating drum;
   combining the continuous fiberglass filaments to form a fiberglass mat;
   expanding the fiberglass mat to form a fiberglass media with progressively increasing density from an air inlet side to an air exit side.

* * * * *